(12) United States Patent
Velez et al.

(10) Patent No.: US 6,320,904 B1
(45) Date of Patent: Nov. 20, 2001

(54) CLUSTERING BLIND CONVERGENCE PROCESS IN AN ADAPTIVE DECISION FEEDBACK EQUALIZER

(75) Inventors: Edgar Velez, Kanata; Ian Dublin, Ottawa, both of (CA); Richard Buz, Rohnert Park, CA (US); Sisay Yirga, Nepean (CA)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/069,519

(22) Filed: Apr. 29, 1998

(51) Int. Cl.[7] ................. H03H 7/30; H04L 5/21
(52) U.S. Cl. ......................... 375/233; 375/261
(58) Field of Search ..................... 375/233, 232, 375/229, 261, 298; 333/28 R; 708/322, 323, 300

(56) References Cited

U.S. PATENT DOCUMENTS

| | | | |
|---|---|---|---|
| 5,119,401 | * 6/1992 | Tsujimoto | 375/233 |
| 5,293,401 | * 3/1994 | Serfaty | 375/231 |
| 5,541,956 | 7/1996 | Ueda | 375/232 |
| 5,642,382 | * 6/1997 | Juan | 375/232 |
| 5,689,528 | 11/1997 | Tsujimoto | 375/233 |
| 5,694,423 | 12/1997 | Larsson et al. | 375/231 |
| 6,069,917 | * 5/2000 | Werner et al. | 375/233 |

* cited by examiner

Primary Examiner—Chi Pham
Assistant Examiner—Khai Tran
(74) Attorney, Agent, or Firm—Pearne & Gordon LLP

(57) ABSTRACT

A blind convergence process for an adaptive decision feedback equalizer that includes an quadrature amplitude modulation (QAM) slicer having a index n, a forward filter defined by a plurality of forward tap coefficients and a feedback filter defined by a plurality of feedback tap coefficients. The blind convergence process includes initializing the forward tap coefficients of the forward filter and the feedback tap coefficients of the feedback filters with predetermined values. The slicer operates in two modes: a clustering mode and a decision directed mode. In the clustering mode the following steps are performed: (1) update the forward tap coefficients of the forward filter using an error estimate (e.g. Sato error), and (2) update the feedback tap coefficients of the feedback filter using an error estimate (e.g. Sato error). In the decision directed mode the following steps are performed: (1) update the forward tap coefficients of the forward filter for a prescribed QAM index n using actual error, and (2) update the feedback tap coefficients of the feedback filter for a prescribe QAM index n using actual error. This process enables blind convergence of an equalizer for a wide range of QAM indexes (e.g. 4–256).

25 Claims, 2 Drawing Sheets

CLUSTERING BLIND CONVERGENCE PROCESS IN AN ADAPTIVE DECISION FEEDBACK EQUALIZER

FIELD OF THE INVENTION

This invention relates to the field of blind convergence processes in an adaptive decision feedback equalizer such as may be used in modems.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. In a particular modulation transmission scheme, the phase and amplitude of a signal are shifted to various combinations of values, each combination indicating a different set of transmitted bits. At the receiver, proper decoding includes detecting the various phase and amplitude combinations. In a two dimensional modulation scheme, the signal can be represented mathematically with an I (in-phase) component and a Q (quadrature-phase) component of the signal, each of which is $\pi/2$ out of phase with respect to the other. The plot of these two components on a two dimensional graph for a set of received symbols results in a pattern referred to as a constellation.

Proper detection of the I and Q components of the signal is hampered by various sources of signal degradation. One such source is intersymbol interference where consecutive transmitted symbols interfere with each other. Other sources of signal degradation include the transmission media (i.e. wire) and analog filters. These factors produce large amplitude and group delay distortion in the signal that needs compensation.

To compensate for intersymbol interference (ISI) and other sources of signal degradation and distortion, best performance is achieved by implementing an equalizer as a fractionally spaced adaptive filter. An adaptive filter can modify from time instant to time instant, the coefficients, also referred to as tap weights, used in the filter to remove ISI and to compensate for amplitude and group delay distortions. The update of the tap weights is done to minimize the error at the output of the filter. This error is effectively a measure of the difference between the actual output of the filter and the expected output. The adaptive process continues until the error is at a minimum (i.e. the filter converges).

The convergence of an equalizer depends on many factors including initial tap weights, desired convergence rate, signal to noise ratio (SNR) at the input and phase changes caused by a clock recovery circuit at the receiver, and can be accomplished with various adaptive algorithms.

The adaptation of the tap weights in adaptive equalizers is based on an assumed correct decision about which symbol was received. This assumption is valid for equalizers with a training sequence for which the received symbol is in fact known in advance. Equalizers, however, are also used without the benefit of a training sequence, in which case the decision is not necessarily correct. These equalizers are referred to as blind equalizers. The term blind refers to trying to find the correct equalizer coefficients without a reference training sequence, therefore during convergence the decisions may be incorrect and the coefficients (weights) erroneously updated. Although the possibility of a mistake exists, if the blind equalizer makes correct decisions for a sufficiently large set of received symbols, the equalizer will converge correctly.

If many erroneous decisions occur, the algorithm may converge to a local minimum (false convergence) or may not converge at all. Two common types of convergence failures for two dimensional modulation schemes such as Quadrature Amplitude Modulation (QAM), where the information is transmitted by modulating both the amplitude and phase of the carrier signal, are summarized below:

1. Both the I and Q parts of the equalizer converge to tap weight settings such that both parts decode the same symbols, either the I symbols or the Q symbols. When the I and Q equalizers converge to similar tap weight settings, the resulting constellation appears as a diagonal line.

2. The I and Q parts converge to tap weight settings such that the I equalizer decodes a symbol transmitted at time t while the Q equalizer decodes a symbol transmitted at time t−1. This failure is difficult to detect since the I and Q parts of the equalizer are passing their respective correct I and Q components, albeit not from the same time instant (i.e. instead of having a $\pi/2$ difference, the I and Q components have a $5\pi/2$ difference).

Prior art solutions for dealing with the convergence failures discussed above continue to present potential problems in their use since filter convergence is not guaranteed in theory, depending on the distortion and noise. Further, convergence without the need for training sequences based on random QAM input is very difficult for higher than 4 QAM since there is no reference signal available.

SUMMARY OF THE INVENTION

An object of the present invention is to provide a blind convergence process for an adaptive decision feedback equalizer to limit convergence failure.

In accordance with an aspect of the present invention there is provided a blind convergence process for an adaptive decision feedback equalizer having an quadrature amplitude modulation (QAM) slicer, a forward filter defined by a plurality of forward tap coefficients and a feedback filter defined by a plurality of feedback tap coefficients, said blind convergence process comprising the steps of:(a) performing a clustering process comprising: (a1) updating the forward tap coefficients of the forward filter, and (a2) updating the feedback tap coefficients of the feedback filter; and (b) initiating a decision directed process comprising: (b1) updating the forward tap coefficients of the forward filter for a prescribed QAM index n, and (b2) updating the feedback tap coefficients of the feedback filter for a prescribed QAM index n.

In accordance with another aspect of the present invention there is provided a blind convergence process for an adaptive decision feedback equalizer having an quadrature amplitude modulation (QAM) slicer, a forward filter defined by a plurality of forward tap coefficients and a feedback filter defined by a plurality of feedback tap coefficients, said blind convergence process comprising the steps of:(a) initializing the forward tap coefficients of the forward filter and the feedback tap coefficients of the feedback filters with predetermined values; (b) performing a clustering process comprising: (b1) updating the forward tap coefficients of the forward filter, and (b2) updating the feedback tap coefficients of the feedback filter; and (c) initiating a decision directed process comprising: (c1) updating the forward tap coefficients of the forward filter for a prescribed QAM index n, and (c2) updating the feedback tap coefficients of the feedback filter for a prescribe QAM index n.

BRIEF DESCRIPTION OF THE DRAWINGS

The present invention will be described in conjunction with the drawings in which.

DETAILED DESCRIPTION OF EMBODIMENTS OF THE INVENTION

Figure 1:
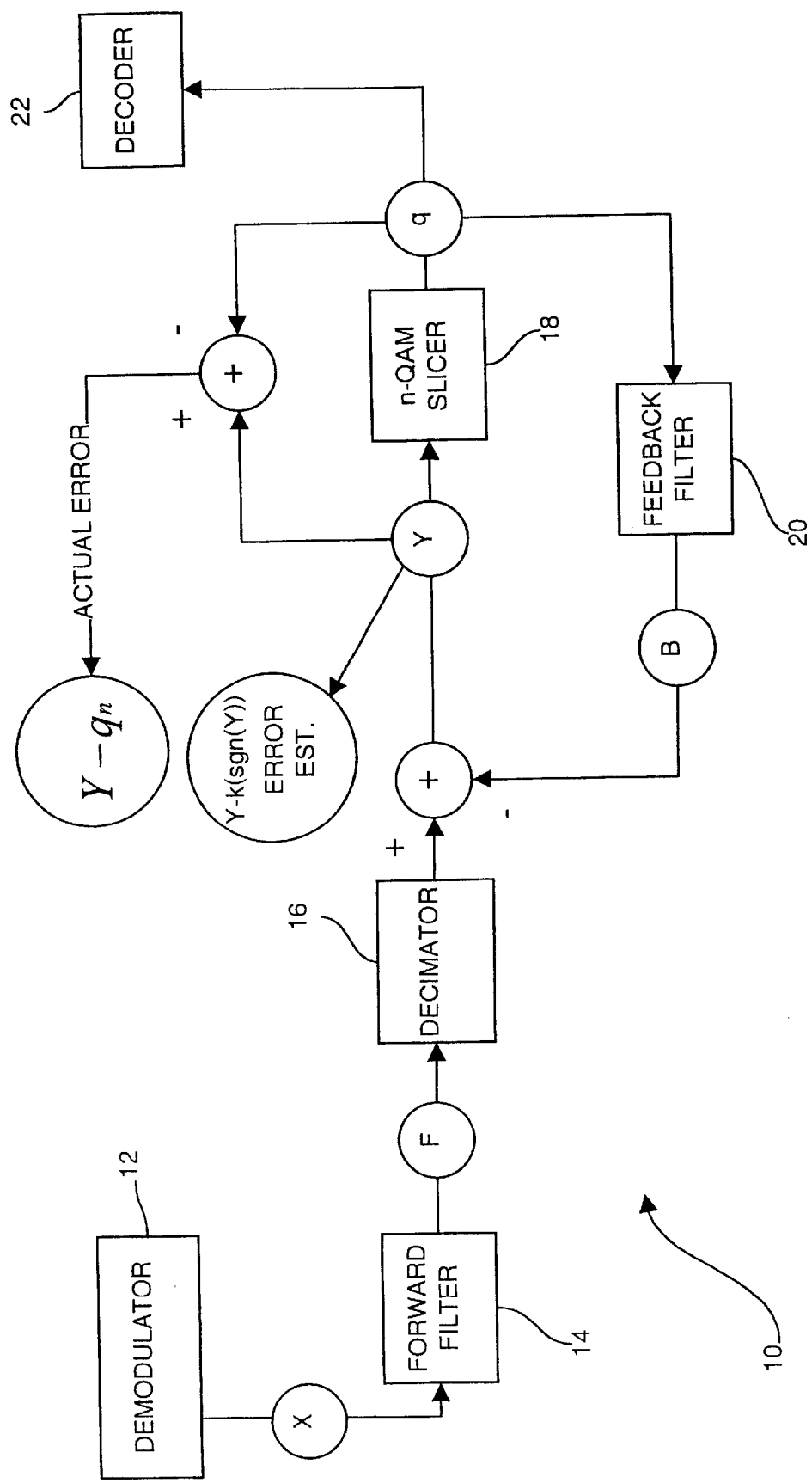
FIG. 1 illustrates a block diagram of an adaptive decision feedback equalizer.

An equalizer 10, shown in FIG. 1, is used to counteract effects of amplitude and phase distortion introduced by a channel and analog front end of a receiver in a modem. The input X=I+jQ to the equalizer 10 is a complex input taken from the output of Nyquist filters located in a demodulator 12, which is first downsampled by a factor of 2 to provide in-phase (I) and quadrature (Q) datastream signals at twice the symbol rate (symbol rate=inverse of the baud rate of the modem).

The input X is passed through a complex-valued forward filter 14 to produce an output F. The output F of the forward filter 12 is downsampled by decimator 16 by a factor of 2, resulting in a symbol rate data sequence. Quantized output q from an n-QAM slicer 18 is used as input to a complex-valued feedback filter 20 to produce an output B. The output B of the feedback filter 28 is subtracted from the down-sampled output (decimated) of the forward filter 14 resulting in an equalized signal Y.

The equalized signal Y is then passed through the n-QAM slicer 18, that quantizes each data sample (for each signal component I and Q of X) to a discrete symbol level in a constellation. The constellation represents a plot of the in-phase (I) component and the quadrature (Q) component of the input signal X on a two dimensional graph for a set of received symbols. An actual error signal $e_a$ is defined as the difference between the equalized signal Y and the quantized output q from the slicer 18. The actual error $e_a$ will be used in a decision directed mode during convergence (discussed in detail below) to update tap coefficients of the forward filter 14 and the feedback filter 20 once per symbol duration. An error estimate is also calculated based on the equalized signal Y as discussed in detail below. The quantized output q of the slicer 18 is sent to a symbol decoder 22 to recover raw data.

The operation of the forward filter 14 is described by the equation:

$$F(t) = \sum_{i=1}^{M} C_{fi} X(t-i)$$

where F(t) represents the complex-valued output of the filter 14 at time t, X(t) is the complex-valued input to the filter 14 at time t, and $C_{fi}$ are the complex-valued filter coefficients (also termed the tap coefficients) for the filter 14. The complex-valued data F(t) is composed of an in-phase (I) component and an quadrature (Q) component.

The operation of the feedback filter 20 is described by the equation:

$$B(t) = \sum_{i=1}^{N} C_{bi} q(t-1-i)$$

where B(t) represents the output of the filter 20 at time t, $C_{bi}$ are the complex-valued feedback filter coefficients for the filter 20, and q(t) is the quantized output of the slicer 18 at time t.

The slicer 18 accepts the signal Y (representing the I and Q components of the equalized signal) and makes a decision as to which QAM symbol is actually received. In order to quantize the signal to the appropriate level in a constellation, the slicer 18 has a pair of control bits which specify the level of QAM constellation being used. An example of the correspondence between control bits and QAM constellation is illustrated in Table A1.

TABLE A1

| QAM CONSTEL-LATION TYPE | QAM MODE CONTROL PINS | QUANTIZED SYMBOL CO-ORDINATE LEVELS | SATO CONSTANT (k) |
|---|---|---|---|
| 4 QAM | 00 | ±½ | ½ |
| 16 QAM | 01 | ±¼, ±¾ | ⅝ |
| 64 QAM | 10 | ±⅛, ±⅜, ±⅝, ±⅞ | 21/32 |
| 256 QAM | 11 | ±1/16, ±3/16, . . . | 85/128 |

Figure 2:
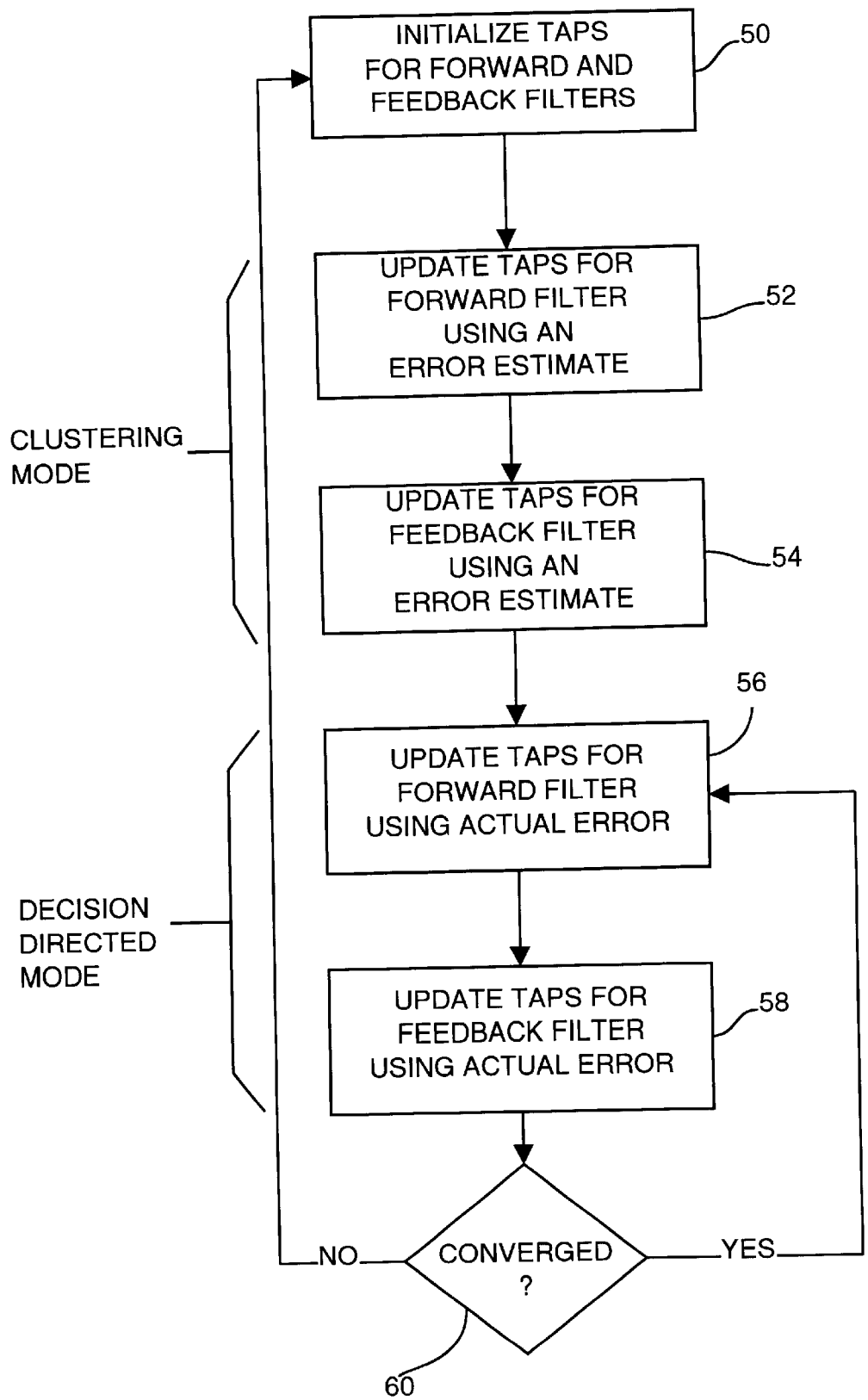
FIG. 2 illustrates a flow chart showing the blind convergence process of the equalizer of FIG. 1 according to the present invention.

The method of blind convergence according to the present invention will be described with reference to the flow chart of FIG. 2. For discussion purposes, the filters 14 and 20 are configured with specific parameters as defined below. It is readily understood by those skilled in the art that the number of taps per filter and the bit representation per tap are design choices.

The real (I) and imaginary (Q) parts of the tap coefficients of the forward filter 14 are stored as 24 bit quantities, but are rounded to 16 bits before being used in the filtering operation. A total of 48 forward complex filter taps are used. The in-phase and quadrature output samples F(t) of the filter 14 are truncated to have a precision of 21 bits. The forward filter 14 of the equalizer 10 is fractionally spaced, and operates at twice the symbol rate.

The complex-valued quantized output q is composed of the I and Q components, each of which has a precision of 5 bits. The real (I) and imaginary (Q) parts of the tap coefficients of the feedback filter 20 are each stored as 24 bit quantities, but are rounded to 16 bits before being used for filtering. The output B(t) (I and Q components) of the filter 20 has a precision of 21 bits. Data is passed through the filter 20 at the symbol rate, and a total of 48 feedback complex filter taps are used.

Initialization

Two options exist for initializing the tap coefficients of the filters 14 and 20 of the equalizer 10 at step 50. The first option is to assign arbitrary tap coefficients to the filters 14 and 20. A second option is to assign specific tap coefficients to the filters 14 and 20 in an effort to improve convergence processing.

One example of assigning specific tap coefficients consists of all tap coefficients of the feedback filter 20 and all but one of the tap coefficients of the forward filter 14 being set to zero. The remaining non-zero coefficient of the forward filter 14 has both the real and imaginary parts set to a value of 1 (i.e. 1+j1). The position of the non-zero tap coefficient of the forward filter 14 is a programmable design choice.

Typically, the last forward tap coefficient in the filter 14 would be initialized with 1+j1. However, to deal with amplitude modulation (AM) or narrowband {radio frequency (RF)} interference it is desirable to initialize a forward tap coefficient with 1+1j before the last tap in the filter 14 (for example at tap coefficient number 14 of the total number of 28 taps).

The slicer 18 operates in two distinct modes: (1) clustering mode and (2) decision-directed mode. In general, decision-directed mode is used to adapt the tap coefficients of filters 14 and 20 based on a standard least-mean-square (LMS) algorithm. In order to ensure the convergence of the tap coefficients of the filters 14 and 20, the slicer 18 must make a sufficient number of correct decisions.

However, the equalizer 10 may not converge in decision-directed mode at start-up if the channel is too distorted, as this would result in most initial quantizations being incorrect. In order to get the equalizer 10 into a state where decision-directed mode operation will function properly, the slicer 18 is initially placed in the clustering mode. In the clustering mode tap coefficients of the filters 14 and 20 are updated using an estimated error $e_e$. In one embodiment, the estimated error $e_e$ is based on the Sato algorithm, which is known in the art. The estimated error $e_e$ based on Sato is defined as:

$$e_e = Y - k(\text{sgn}(Y)) = Y - (\pm k \pm jk) = Y - k(\pm 1 \pm j1)$$

where k is the Sato constant and Y is the slicer input at time t.

The estimated error $e_e$ is not based on the quantized output q of the slicer 18. Also, the Sato constant k is dependent on the type of QAM constellation selected during the clustering mode and is defined in Table A1 above for a sample of signal sets. During the clustering mode a clustering of symbols occurs around the constellation points (e.g. 4 points for 4 QAM where k=½) obtained by the Sato constant and prepares the tap coefficients of the filters 14 and 20 to the point where the decision-directed mode will improve the probability of convergence in the equalizer 10.

Other error estimators ($e_n$) can be used during the clustering mode including the constant modulus algorithm (CMA) defined by the following equation:

$$e_n = Y^*(R_2 - |Y|_2)$$

where $R_2$ depends on the QAM index.

Clustering Mode

The tap coefficients of the forward filter 14 are updated at step 52 once for every pair of input data samples X. The taps of the forward filter 14 are updated using the following equation:

$$C_{fi} = C_{fi-1} + (\mu_f)(e_e)(X)$$

where $C_{fi}$ represent the tap coefficients of the forward filter 14

$\mu_f$ represents an adaptation rate variable used to update the tap coefficients of the forward filter 14

$e_e$ represents the estimated error

X represents the complex input signal (I+jQ)

After approximately 70–80K of random symbols a "squarish" constellation begins to form. However, the error (or lack of convergence) remains relatively high. The QAM level is still unknown at this stage and can vary from 4 to 256 QAM for example.

The tap coefficients of the feedback filter 20 are updated at step 54 at the symbol rate using the following equation:

$$C_{bi} = C_{bi-1} + (\mu_b)(e_e)(X)$$

where $C_{bi}$ represent the tap coefficients of the feedback filter 20

$\mu_b$ represents an adaptation rate variable used to update the tap coefficients of the feedback filter 20

$e_e$ represents the estimated error

X represents the complex input signal (I+jQ) After approximately 10–20K of random symbols the constellation is much more defined and the error begins to reach a converged (minimum) level.

Decision Directed Mode

At steps 56 and 58, the tap coefficients of the forward and feedback filters, respectively, are updated using the actual error $e_a$ for a QAM index (n) based on the output Y and the quantized output q from the n-QAM slicer 18. In particular, in decision-directed mode, updates of the tap coefficients of the forward and feedback filters are performed using the following equations:

Tap updates for forward filter 14 at step 56

$$C_{fi} = C_{fi-1} + (\mu_f)(e_a)(X)$$

where $C_{fi}$ represent the tap coefficients of the forward filter 14

$\mu_f$ represents an adaptation rate variable used to update the tap coefficients of the forward filter 14

$e_a$ represents the actual error for a given QAM index (n) and is defined as $e_a = Y - q_n$ X represents the complex input signal (I+jQ)

Tan updates for feedback filter 20 at step 58

$$C_{bi} = C_{bi-1} + (\mu_b)(e_a)(X)$$

where $C_{bi}$ represent the tap coefficients of the feedback filter 20

$\mu_b$ represents an adaptation rate variable used to update the tap coefficients of the feedback filter 20

$e_a$ represents the actual error for a given QAM index (n) and is defined as $e_a = Y - q_n$ X represents the complex input signal (I+jQ)

During the initial blind convergence process, steps 56 and 58 are processed for approximately 10–20K of random symbols at which time the constellation will be essentially formed and the error reaches a converged (generally steady state in time) operating mode. If the error is below a predefined threshold, determined at step 60, the process continues to step 56 to maintain the equalizer in the converged state. If the error is above the predefined threshold, determined at step 60, the process returns to the initialization step 50 to reconverge the equalizer 10.

What is claimed is:

1. A blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of:

(a) performing a clustering process comprising:

(a1) updating the forward tap coefficients of the forward filter using an estimated error derived using a blind equalization algorithm, and (a2) updating the feedback tap coefficients of the feedback filter also using an estimated error derived using a blind equalization algorithm; and (b) initiating a decision directed process comprising:
  (b1) updating the forward tap coefficients of the forward filter for a prescribed QAM index n, and
  (b2) updating the feedback tap coefficients of the feedback filter for a prescribed QAM index n.

2. The process of claim 1, further including, after step (b2), determining if the equalizer has converged and repeating steps (b1) and (b2) if the equalizer has converged.

3. The process of claim 1, wherein the estimated error is defined as:

$e_e = Y - k(\text{sgn}(Y)) = Y \pm (k \pm jk) = Y - k(\pm 1 \pm j1)$, where $e_e$, is the estimated error, Y is an equalized signal from the forward filter and k is a prescribed error level variable.

4. The process of claim 4, wherein k is set to a value of ½ when the prescribed QAM index is 4.

5. The process of claim 3, wherein k is set to a value of ⅝ when the prescribed QAM index is 16.

6. The process of claim 3, wherein k is set to a value of 21/32 when the prescribed QAM index is 64.

7. The process of claim 3, wherein k is set to a value of 85/128 when the prescribed QAM index is 256.

8. The process of claim 3, wherein the step of updating the forward tap coefficients of the forward filter during the clustering process is defined by:

$C_{fi} = C_{fi-1} + (\mu_f)(e_e)(X)$ where $C_{fi}$ represent the forward tap coefficients of the forward filter; $\mu_f$ represents an adaptation rate variable for the forward filter; and X represents an input signal to the forward filter.

9. The process of claim 8, wherein the step of updating the feedback tap coefficients of the feedback filter during the clustering process is defined by:

$C_{bi} = C_{bi-1} + (\mu_b)(e_e)(X)$ where $C_{bi}$ (represents the feedback tap coefficients of the feedback filter and $\mu_b$ represents an adaptation rate variable for the feedback filter.

10. The process of claim 1, wherein steps (b1) and (b2) of the decision directed process are performed using an actual error based on the prescribed QAM index n.

11. The process of claim 10, wherein the actual error is defined as:

$e_a = Y - q_n$ where $e_a$ is the actual error, Y is an equalized signal from the forward filter and input to the n-QAM slicer of the equalizer and $q_n$ is the quantized output from the QAM slicer for the prescribed QAM index n.

12. The process of claim 11, wherein the step of updating the forward tap coefficients of the forward filter during the decision directed process is defined by:

$C_{fi} = C_{fi-1} + (\mu_f)(e_a)(X)$ where $C_{fi}$ represents the forward tap coefficients of the forward filter; $\mu_f$ represents an adaptation rate variable for the forward filter; and X represents an input signal to the forward filter.

13. The process of claim 12, wherein the step of updating the feedback tap coefficients of the feedback filter during the decision directed process is defined by:

$C_{bi} = C_{bi-1} + (\mu_b)(e_a)(X)$ where $C_{bi}$ represents the feedback tap coefficients of the feedback filter and $\mu_b$ represents an adaptation rate variable for the feedback filter.

14. A blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of:
  (a) initializing the forward tap coefficients of the forward filter and the feedback tap coefficients of the feedback filters with predetermined values;
  (b) performing a clustering process comprising:
    (b1) updating the forward tap coefficients of the forward filter using an estimated error derived using a blind equalization algorithm, and
    (b2) updating the feedback tap coefficients of the feedback filter also using an estimated error derived using a blind equalization algorithm; and
  (c) initiating a decision directed process comprising:
    (c1) updating the forward tap coefficients of the forward filter for a prescribed QAM index n, and
    (c2) updating the feedback tap coefficients of the feedback filter for a prescribed QAM index n.

15. The process of claim 14, further including, after step (c2), determining if the equalizer has converged and repeating steps (c1) and (c2) if the equalizer has converged.

16. The process of claim 14, wherein step (a) includes: setting the feedback tap coefficients to zero and setting all but a selected one to the forward tap coefficients to zero.

17. The process of claim 16, wherein the selected one of the forward tap coefficients is a last tap coefficient of the forward tap coefficients and is set to a value of 1.

18. The process of claim 16, wherein the selected one of the forward tap coefficients is an upper-half tap coefficient of the forward tap coefficients and is set to a value of 1.

19. The process of claim 14, wherein the estimated error is defined as:

$e_e = Y - k(\text{sgn}(Y)) = Y \pm (k \pm jk) = Y - k(\pm 1 \pm j1)$, where $e_e$ is the estimated error, Y is an equalized signal from the forward filter and k is a prescribed error level variable.

20. The process of claim 19, wherein the step of updating the forward tap coefficients of the forward filter of the clustering process is defined by:

$C_{fi} = C_{fi-1} + (\mu_f)(e_e)(X)$ where $C_{fi}$ represents the forward tap coefficients of the forward filter; $\mu_f$ represents an adaptation rate variable for the forward filter; and X represents an input signal to the forward filter.

21. The process of claim 20, wherein the step of updating the feedback tap coefficients of the feedback filter of the clustering process is defined by:

$C_{bi} = C_{bi-1} + (\mu_b)(e_e)(X)$ where $C_{bi}$ represents the feedback tap coefficients of the feedback filter; and $\mu_b$ represents an adaptation rate variable for the feedback filter.

22. The process of claim 14, wherein steps (c1) and (c2) of the decision directed process are performed using an actual error based on the prescribed QAM index n.

23. The process of claim 22, wherein the actual error is defined as:

$e_a = Y - q_n$ where $e_a$ is the actual error, Y is an equalized signal from the forward filter and input to the N-QAM slicer of the equalizer and $q_n$ is the quantized output from the QAM slicer for the prescribed QAM index n.

24. The process of claim 23, wherein the step of updating the forward tap coefficients of the forward filter of the decision directed process is defined by:

$C_{fi} = C_{fi-1} + (\mu_f)(e_a)(X)$ where $C_{fi}$ represents the forward tap coefficients of the forward filter; $\mu_f$ represents an adaptation rate variable for the forward filter; and X represents an input signal to the forward filter.

25. The process of claim 24, wherein the step of updating the feedback tap coefficients of the feedback filter of the decision directed process is defined by:

$C_{bi} = C_{bi-1} + (\mu_b)(e_a)(X)$ where $C_{bi}$ represents the feedback tap coefficients of the feedback filter, and $\mu_b$ represents an adaptation rate variable of the feedback filter.

* * * * *

UNITED STATES PATENT AND TRADEMARK OFFICE
CERTIFICATE OF CORRECTION

PATENT NO.    : 6,320,904 B1
DATED         : November 20, 2001
INVENTOR(S)   : Edgar Velez et al.

It is certified that error appears in the above-identified patent and that said Letters Patent is hereby corrected as shown below:

<u>Title page,</u>
Item [73], delete "Northern Telecom Limited, Montreal (CA)" and insert therefor
-- Nortel Networks Limited, Montreal (CA) --.

Signed and Sealed this

Tenth Day of June, 2003

JAMES E. ROGAN
*Director of the United States Patent and Trademark Office*